Dec. 11, 1951   C. M. RYAN   2,578,019
ARTIFICIAL LIMB
Filed Aug. 16, 1950
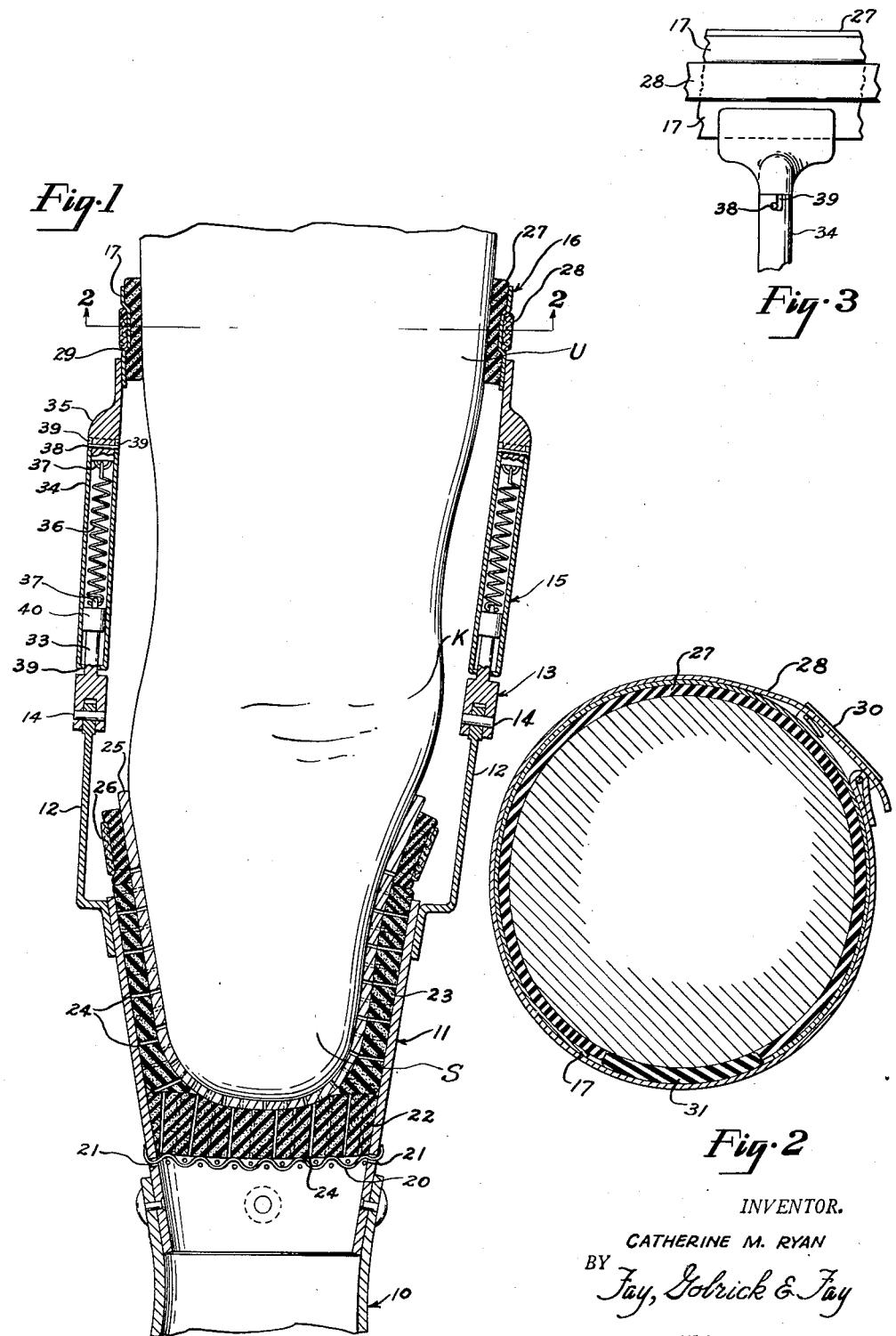
INVENTOR.
CATHERINE M. RYAN
BY Fay, Gobrick & Fay
ATTORNEYS Patented Dec. 11, 1951

2,578,019

UNITED STATES PATENT OFFICE 2,578,019

ARTIFICIAL LIMB

Catherine M. Ryan, Cleveland Heights, Ohio

Application August 16, 1950, Serial No. 179,813

9 Claims. (Cl. 3—3)

The present invention relates to improvements in the construction of artificial limbs. Though particularly useful for that type of artificial limb for use after an amputation below the knee, this invention may also find advantageous use after other types of amputations of legs or arms.

An object of the present invention is the provision of an artificial leg having a stump socket and movable knee joint construction which minimizes or eliminates the tendency towards limping which develops with the prosthetic devices of the prior art, due to the stump dropping into the socket when the weight of the body is thrown onto the artificial limb.

Another object is the provision of a stump socket construction which distributes the pressure on the stump of the wearer in a manner which prevents chafing soreness developing in the stump.

Another object is the provision of a stump socket and joint structure which prevents displacement of the stump in respect to the leg or the socket when the knee joint is flexed.

A further object is a provision of a comfortable, ventilated, sanitary and light weight prosthetic device in which freedom of movement is maintained.

Another object is the provision of an artificial leg in which the above features are obtained but which is, nonetheless, readily fitted to the wearer.

With the above and other objects in view, which will be apparent from the detailed description which follows, the invention consists in certain novel features of construction and combination of parts which will be readily understood by those skilled in the art to which the invention appertains. In the drawing which illustrates an embodiment of the invention, Fig. 1 is a vertical section taken through the middle of the joint and socket construction;

Fig. 2 is a cross-section taken along the line 2—2 of Fig. 1, showing the cross-section of the thigh clamping band; and Fig. 3 is a side view of the upper end of the hinge member, showing the bayonet pin and slot structure by which the upper shaft and guide tube are locked together.

In Fig. 1 U indicates part of the leg above the knee joint, and S the stump portion below the knee. The artificial limb of this invention, shown in Fig. 1 in vertical section as applied to a leg, comprises a leg replacement structure 10, formed of metal, a plastic or other suitable material in any suitable structure, to the upper part of which is attached a stump casing 11, preferably fabricated of a light weight metal, carrying lower hinge arms 12 of the hinge members 13 oppositely and laterally disposed on the stump casing and pivoted at 14 to the telescoping upper hinge arm 15 which in turn is affixed to the upper or thigh clamp 16 on opposite sides of the split metal band structure 17. The stump casing 11, preferably of frustro-conoidal shape and dimensioned according to stump size and shape, is provided interiorly with a stump padding and supporting structure which covers and resiliently supports the end of the stump. Bottom support is given the stump by a reticular floor 20 formed of gut, cord or other filamentary material interlaced in any suitable manner through a series of holes 21 arranged circumferentially in the lower end of the casing 11 above the end of member 10 and by padding 22 placed over the lacing. Lateral support and cushioning of the stump is obtained by side padding 23 interposed circumferentially between the stump and the wall of the casing. These pads may consist of foam or sponge rubber or other suitable resilient material and are provided with ventilation holes 24. A cap 25 of absorbent material immediately surrounds the stump and serves to facilitate ventilation of the stump and also as a perspiration absorbing sanitary liner for the socket which may be readily removed for cleaning or replacement. To hold the padding on the stump there is an adjustable strap 26 around the upper part 26a of the padding 23.

As shown in the drawing, the reticular floor 20 and bottom padding 22 form a continuous bottom for the stump socket. However, where the condition of the stump requires, an aperture may readily be provided in the padding 22 and the floor 20, so that the stump is free of pressure over the very area that is particularly sensitive while a maximum of support is given. The provision of the laced type flooring allows quick and ready changing, either from a continuous floor structure to one provided with a suitably placed aperture, or, in the case of an apertured flooring, from one position of the aperture to another, by merely changing the position or pattern of the lacings, and then cutting the bottom padding aperture to correspond.

The cap 25, shown in the drawing as ending just above the top of side padding 23 may be woven of elastic thread and extended upward at the sides and back to be held at the top beneath thigh band 16, the upward extension being stretched lengthwise of the leg when the leg is straight, thereby causing the hinged joint to flex in a more natural manner when the leg is lifted in walking. The same effect may be achieved with the cap 25 made in the form of an elastic stocking held at the top by thigh band 16 merely by having the back portion of the cap under longitudinal tension behind the knee joint. Extending the cap up to the thigh band in this way also results in a socket structure which gives an additional sense of security to the wearer, a distinct psychological advantage.

To obtain more even distribution of pressure on the stump, the stump socket is preferably shaped interiorly to correspond to the stump configuration. This may be done by taking an impression of the stump in a suitable material applied to the stump in plastic state and then allowed to set to a rigid form. Thereafter a positive model of the stump may be made from the impression, for example by casting plaster therein. The plaster model may then be used in either of two ways to give a stump socket of suitable conformation. By one method, the model may be built up by an additional thickness corresponding to the thickness of the padding which will be used. This oversize model is then used to fabricate a socket casing 11 by any of the methods known to the metal working art. The resulting casing is then lined with padding of the chosen thickness. By the second method, a stump socket is shaped to conform to the stump by building up the padding on the stump model in the pattern and thickness indicated by the stump condition, sheathing the padding on the model with a sheet of plastic or elastic material which may be bonded to the padding, locating about the padded model a form having the interior dimensions of a standard socket casing, and filling the space left between the sheathed padding and the form with a material which may be cured, or caused to set, in a manner depending upon the material used, so that there results an integral padding structure interiorly conformed to the stump and exteriorly conformed to the interior surface of a standard size socket casing. Either method results in a stump socket with the padded interior conformed to the stump of the wearer. Thereafter the padding and casing may be simultaneously pierced to provide the casing and padding with aligned perforations 24.

The upper or thigh band 16 for principal attachment of the prosthetic comprises the aforementioned split metal ring 17 carrying the upper ends of the upper hinge arm 15, a split ring of resilient padding 27 between the metal ring 17 and the thigh, a strap 28 seated in a groove formation 29 in the ring and provided with a buckle or other adjustable fastening device 30, and a strip of resilient padding 31, which may be affixed to the strap 28, placed in the space between the ends of ring 17 and padding ring 27. The strip 31 equals in thickness the thickness of the metal ring 17 and the padding ring 27, while its length is less than the space left between the ends of ring 27 to allow some variation in the band size during adjustment to the thigh. Hence the split portion of rings 17 and 27 should coincide. The padding of the thigh band may also consist of sponge rubber or other pliable material. The hinge members 13 include in the upper hinge arm 15 elastic means which renders the pivoting motion of the knee free with respect to slight extension and retraction. The upper arm as shown here comprises a lower shaft 33 sliding in a guide tube 34, an upper shaft 35, and a tension spring 36 linking the upper and lower shafts by means of the eyes 37 thereon. The guide tube 34 is removably attached to the upper shaft 35 by means of a bayonet pin 38, the ends of which lock in slots 39 in the guide tube end. The lower shaft carried immediately by the pivot is freely movable in the tube within certain limitations defined by the design of the device. The lower end of the guide tube 34 is necked down at 39 to journal the shaft 33, which may be provided on its inner end with a piston-like enlargement 40 approximately the size of the interior of the tube, which serves as a stop for the downward movement of the shaft 33.

To obtain a flexing action of the knee joint, the springs 36 should be under tension when the limb is straight so that as the wearer swings the limb forward in walking, the springs draw upward on the lower part of the limb. This action of the springs is facilitated by placing the pair of hinge members 13 laterally and oppositely to each other at a position somewhat back of the transverse centerline of the limb. A similar result may be obtained using non-extensible hinges, when a cap 25 is used which extends from the stump to the upper clamping band as previously explained.

With the construction of the drawing the upper band may be readily freed from the lower part of the leg merely by turning the guide tube 34 to release the bayonet fastener at the upper end, extending the spring by a downward pull to draw the tube off the upper shaft to expose the hook and eye link of the spring on the upper shaft, and then unhooking the spring at each side to release the lower part of the limb. In place of the bayonet pin and slot structure the upper shaft 35 may be made longer to project down into the guide tube 34 far enough so that it will not slip out during the use of the limb. This construction still allows detachability by drawing the leg downward to pull the upper shafts clear of the guide tubes for unhooking the spring from the upper shafts. However, a simpler construction may be used by fixing the upper shaft 35 in tube 34 by a pin extending through both tube and shaft.

I claim:

1. In an artificial limb, a limb replacement; a stump socket casing carried by said limb replacement; stump padding comprising soft elastic material disposed along the floor and sides of the casing, a replaceable sanitary stump cap within the said elastic material, and an adjustable circumferential strap at the top of said padding for binding the padding to the stump; a padded clamping band for holding the artificial limb on the limb of the wearer above the limb joint and a pair of extensible hinge members oppositely and laterally disposed between said socket casing and said clamping band.

2. In an artificial limb, a limb replacement; a stump socket casing carried by said limb replacement, said socket casing having a reticular floor formed of filamentary material laced through a circumferential series of holes in the casing wall; stump padding comprising soft elastic material lining the floor and sides of the casing, said padding being provided with ventilating channels, a replaceable sanitary stump cap within the said elastic material, and an adjustable circumferential strap adjacent the edge of said padding for binding the padding to the stump; a padded clamping band for holding the artificial limb on the limb of the wearer, and a pair of extensible hinge members oppositely and laterally disposed between said socket casing and said clamping band.

3. An artificial limb comprising a limb replacement, a stump socket casing carried by said limb replacement and adapted to receive padding capping the stump of the wearer, a clamping band for holding the artificial limb on the limb of the wearer, and a pair of extensible hinge members oppositely and laterally disposed between said socket casing and said clamping band, one of the arms of each of said extensible hinge members including a guide tube, a shaft with one end carried by the pivot of the hinge and the other within the guide tube, a second shaft with one end within the guide tube, one of said shafts being slidable within the guide tube, and a coiled tension spring connecting the shaft ends within said guide tube.

4. An artificial limb comprising a limb replacement, a stump socket casing carried by said limb replacement and adapted to receive padding capping the stump of the wearer, a clamping band for holding the artificial limb on the limb of the wearer, and a pair of extensible hinge members oppositely and laterally disposed between said socket casing and clamping band, one of the arms of each of said hinge members including a guide tube, a shaft having one end carried by the pivot of the hinge and with the other end within the guide tube, a second shaft with one end within the guide tube, one of said shafts being slidable within the guide tube and the other shaft being detachably secured to the guide tube, and a coiled tension spring connecting the shaft ends within said guide tube.

5. In an artificial limb, a stump socket casing comprising a hollow socket casing attached at one end to the limb replacement of the artificial limb and provided with a circumferential series of holes above the line of attachment to the limb replacement, a reticular floor formed of lacings passed through said holes, channeled soft elastic padding disposed on said floor and the inner surface of said casing above the floor, and an adjustable band adapted to bind said padding on the stump of the wearer.

6. In an artificial limb, a stump socket comprising a hollow socket casing of frustro-conoidal form attached at its smaller end to the limb replacement of the artificial limb and provided with a circumferential series of holes above the line of attachment to the limb replacement, a reticular floor formed of lacings passed through said holes, perforated soft elastic padding lining said floor and the inner surface of said casing above the floor, a replaceable sanitary stump cap lining said padding, and an adjustable band adapted to bind said padding and said stump cap on the stump of the wearer.

7. In an artificial limb, a stump socket comprising a hollow socket casing of frustro-conoidal form attached at its smaller end to the limb replacement of the artificial limb and provided with a circumferential series of holes above the line of attachment to the limb replacement, a reticular floor formed of lacings passed through said holes, soft elastic padding lining said floor and the inner surface of said casing above the floor, said padding and the wall of said casing being provided with aligned ventilation channels, a replaceable sanitary stump cap lining said padding, and an adjustable band adapted to retain said stump cap on the stump of the wearer.

8. In an artificial limb, a limb replacement, a stump socket casing carried by said limb replacement, said socket casing having a reticular floor formed of filamentary material laced through a circumferential series of holes in the casing wall; stump padding comprising soft elastic material lining the floor and sides of the casing, said padding being provided with ventilating channels, and an adjustable circumferential strap adjacent the top of said padding for contracting the padding about the stump; a padded clamping band for holding the artificial limb on the limb of the wearer; a pair of hinge members oppositely and laterally disposed between said socket casing and said clamping band; and a removable elastic fabric stump cap with its closed end in the stump socket and its open end beneath the said clamping band.

9. In an artificial limb, a stump socket casing comprising a hollow casing attached at one end to the limb replacement of the artificial limb and provided with a circumferential series of holes, a reticular floor formed of lacings passed through said holes, and channeled soft elastic padding disposed on said floor and the inner surface of said casing above said floor.

CATHERINE M. RYAN.

REFERENCES CITED

The following references are of record in the file of this patent:

UNITED STATES PATENTS

| Number | Name | Date |
|---|---|---|
| 137,711 | Palmer | Apr. 8, 1873 |
| 912,130 | James | Feb. 9, 1909 |
| 1,265,308 | Doty | May 7, 1918 |
| 1,366,027 | Savastano | Jan. 18, 1921 |